Oct. 15, 1968   B. J. EHRLICH   3,406,272
WELDING APPARATUS
Filed Feb. 15, 1965   2 Sheets-Sheet 1

Burney J. Ehrlich,
Inventor.
Koenig, Senniger, Powers and Leavitt,
Attorneys.

United States Patent Office 3,406,272
Patented Oct. 15, 1968

3,406,272
WELDING APPARATUS
Burney J. Ehrlich, Houston, Tex., assignor to Texas Instruments Incorporated, Dallas, Tex., a corporation of Delaware
Filed Feb. 15, 1965, Ser. No. 432,593
2 Claims. (Cl. 219—109)

ABSTRACT OF THE DISCLOSURE

Disclosed herein is an infrared detecting system for verifying the quanlity of a weld in a weld zone. The peak value of the signal obtained from the infrared detector is compared with preselected limits and a signal is given if the limits are exceeded to provide an indication if the peak temperature of the weld zone falls outside of a preselected band of acceptable temperatures.

---

This invention relates to apparatus for welding connections in miniature electronic networks and more particularly to such apparatus which includes means for controling or verifying weld quality.

In the manufacture of miniature electronic networks such as those assembled on so-called printed circuit boards and those including integrated circuits in which a plurality of circuit components are manufactured as integral portions of a unitary crystalline structure of semiconductor material, a preferred method of establishing connections to discrete leads is by welding one conductor to another. However, in welding very small leads, it becomes very difficult to control weld temperatures so that a satisfactory weld is obtained without using so much heat that the lead or the associated electronic components are damaged. Similarly, in welding leads to thin conductive films deposited on a substrate, it is important to apply the proper amount of heat at the right temperature so that a good weld is obtained without excessively weakening the bond between the conductive layer and the substrate. Further, to reduce thermal shock in such cases it may be desirable to program the heating with temperature-controlled preheat and postheat periods.

The welding of miniature components is advantageously accomplished by applying a pulse of current to a welding circuit including at least a pair of electrodes which define the welding zone. The current pulse is conveniently obtained by means of a capacitive discharge power source. Various electronic expedients have heretofore been employed to control the amount of energy applied to the welding zone or the voltage which is applied across the electrodes. However, even with such controls, the weld temperature can vary substantially if there are changes in various other parameters such as the type and thickness of the materials being welded, the character of the substrate, if any, and the heat-sink effect of the electrodes themselves.

In view of the above, among the several objects of the invention may be noted the provision of pulse welding apparatus for use in welding connections in miniature electronic networks in which the welding energy is controlled in response to the temperature of the weld; the provision of such apparatus in which the weld temperature is controlled as a function of time according to a preselected program; the provision of pulse welding apparatus including means for verifying the quality of the weld; the provision of such apparatus which has a rapid and yet precise response, which is reliable and of relatively simple and inexpensive construction. Other objects and features will be in part apparent and in part pointed out hereinafter.

According to one aspect of the invention, the temperature of the welding zone, defined by the position of the welding electrodes, is sensed by detecting the infrared radiation emitted thereby. As the temperature at the weld zone can be expected to fluctuate rapidly due to the small size of the components being welded, the detection is preferably accomplished by a detector having a very rapid response. A signal is obtained from the detector and is applied to a means for modulating the power applied to the welding circuit as an inverse function of the intensity of the radiation received by the detector. Such modulation will cause the temperature of the weld to be controlled or limited at a predetermined level. In a preferred embodiment the detector signal is compared with an easily adjustable reference signal and the modulation is performed as a function of the difference between the signal and reference levels, whereby the temperature level at which the weld is controlled can be easily preselected. In another embodiment the reference signal is varied as a preselected function of time thereby to control the weld temperature according to a preselected program.

In another aspect of the invention, the peak value of the signal obtained from the detector is compared with preselected limits and a signal is given if the limits are exceeded thereby to provide an indication if the peak temperature of the weld zone falls outside of a preselected band of acceptable temperatures.

The invention accordingly comprises the apparatus hereinafter described, the scope of the invention being indicated in the following claims.

In the accompanying drawing, in which several of various possible embodiments of the invention are illustrated, FIG. 1 is a diagrammatic illustration of a temperature-controlled pulse welding apparatus;

Corresponding reference characters indicate corresponding parts throughout the drawings.

Figure 1:
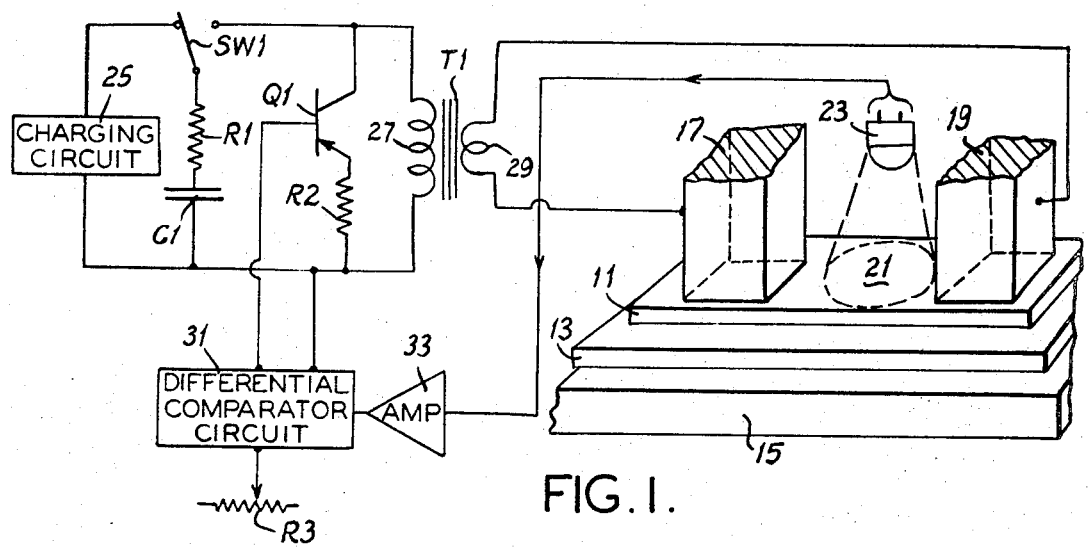

Referring now to FIG. 1, the apparatus illustrated therein is arranged for parallel gap welding a pair of thin metallic layers 11 and 13 which are supported on an insulating substrate 15. A pair of electrodes 17 and 19 (shown greatly enlarged) are pressed into engagement with the upper metallic layer 11. A welding current, applied to layers 11 and 13 by means of electrodes 17 and 19 will cause a localized heating of the layers which, if properly controlled, will weld the layers together. Due to the heat-sink effect produced by the presence of electrodes 17 and 19, the greatest rise in temperature will occur between the two electrodes. The area 21 between electrodes 17 and 19 is thus defined as a welding zone. If the materials of the two layers are the same, the highest temperature will actually occur at the interface between the two layers but the temperature at the upper surface of layer 11 will be essentially proportional to this highest temperature and thus an effective measure thereof.

When layers 11 and 13 are heated to temperatures in the welding range, substantial infrared radiation will be emitted by zone 21. This radiation is sensed by a detector 23 which is chosen to have a very rapid response. This detector develops a signal which provides information useful for controlling the welding operation. A particularly appropriate form of detector, which is also small enough for convenient positioning adjacent the welding electrodes, is a photosensitive semiconductor diode.

Electrodes 17 and 19 are interconnected in a welding circuit with a capacitive discharge power source adapted for selectively applying a pulse of welding current to the electrode circuit. Energy is stored, prior to the application of a current pulse, in a capacitor C1. The capacitor circuit includes a series current-limiting resistor R1. A double-pole switch SW1 enables capacitor C1 to be connected to either a charging circuit 25 or the primary winding 27 of a step-down transformer T1. Transformer T1 includes a low-voltage, high-current secondary winding 29 which is connected to the electrodes 17 and 19.

Primary winding 27 is shunted by a regulator circuit which includes the emitter-collector circuit of a power transistor Q1 and a resistor R2 connected in series with the emitter terminal of transistor Q1. The base terminal of transistor Q1 is connected to a differential comparator circuit 31 which controls conduction through the emitter-collector circuit. The control exercised by comparator circuit 31 is a function of the difference between a pair of input signals applied thereto. One of these input signals is an adjustable reference voltage, the source of which is indicated schematically by potentiometer R3. As will be apparent from the following explanation, this reference voltage is an analog of a preselected temperature for the zone 21. The other input signal to comparator circuit 31 is the signal obtained from the detector 23, amplified as at 33.

The operation of the apparatus shown in FIG. 1 is essentially as follows. With switch SW1 in the position shown, capacitor C1 is charged to a predetermined voltage, the value of capacitor C1 being such that an appreciable quantity of energy is stored therein. When the movable arm of switch SW1 is moved to the right, the energy stored in capacitor C1 is applied to primary winding 27 as a heavy surge of current. This current, amplified by the turns ratio of transformer T1, is applied to the welding circuit comprising electrodes 17 and 19. The flow of current will cause heating of layers 11 and 13 in the zone 21 and thus infra-red radiation will be emitted to be received by detector 23. The amplified detector signal is compared, in comparator circuit 31, with the reference voltage provided at R3. As long as the detector signal is smaller than the reference signal, no forward bias is applied to transistor Q1. However, as the detector signal begins to exceed the reference voltage, due to increased heating of the welding zone 21, a forward bias, proportional to the difference between the input signals, is applied to the base terminal of transistor Q1. This forward bias will cause transistor Q1 to conduct, thereby shunting some of the current flow from capacitor C1 away from primary winding 27. As this shunting will also reduce the current flowing in the secondary winding 29, it can be seen that conduction in transistor Q1 modulates the welding current supplied to electrodes 17 and 19. Since an increase in the detector signal produces a decrease in welding current, and thus also a decrease in the amount of infra-red radiation emitted by the welding zone 21, it will be seen that the apparatus of FIG. 1 constitutes a feedback loop which holds the temperature in the welding zone 21 at a predetermined level. The level can be adjusted or preselected by varying the setting of potentiometer R3.

Figure 4:
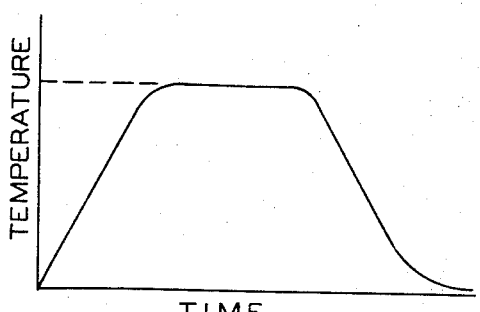
FIG. 4 is a graph illustrating the behavior of weld zone temperature with respect to time and the apparatus of FIG. 1.

FIG. 4 illustrates the variation of temperature in welding zone 21 with respect to time for a single discharge of capacitor C1. The temperature rises rapidly until the preselected level, indicated by the dotted line, is reached and then the temperature is held at that level until the decaying discharge of capacitor C1 causes the temperature to again fall.

Figure 2:
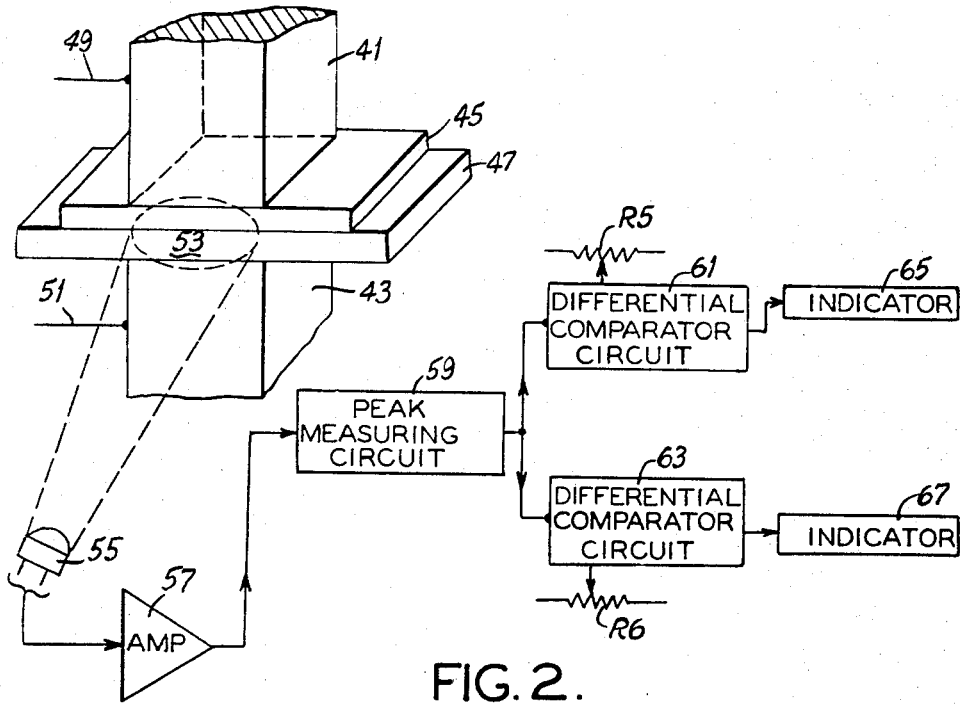
FIG. 2 is a diagrammatic illustration of pulse welding apparatus including means for verifying the quality of welds by sensing the peak welding temperature.

FIG. 2 illustrates pulse welding apparatus which includes means for verifying the quality of welds made thereby. In this apparatus a pair of electrodes 41 and 43 are arranged for opposed gap welding of a pair of thin metallic layers 45 and 47 held therebetween. Leads 49 and 51 are provided for connection of the electrodes to a conventional capacitive discharge power source (not shown). The portion of layers 45 and 47 between the electrodes constitutes a welding zone 53 and a detector 55 is positioned to receive infra-red radiation emitted thereby. The signal provided by detector 55 is amplified as at 57 and is applied to a peak measuring circuit 59. Peak measuring circuit 59 is arranged to sense and hold the peak value of the amplified detector signal for each welding pulse. This peak signal value is representative of the peak temperature reached by the weld zone 53.

The peak detector signal sensed and held by circuit 59 is applied to each of a pair of differential comparator circuits 61 and 63. Each of the comparator circuits 61 and 63 compares the peak level with a respective reference voltage, the sources of which are again schematically represented by potentiometers R5 and R6, respectively. Comparator circuit 61 is connected to operate an indicator device 65 when the peak detector signal exceeds the reference voltage provided through potentiometer R5. The setting of potentiometer R5 thus establishes an upper limit for the value of the peak detector signal, indicator 65 being operated if this limit is exceeded.

Comparator circuit 63 is connected to operate an indicator device 67 if the peak detector signal falls below the reference voltage provided through potentiometer R6. Thus the setting of potentiometer R6 establishes a lower limit for the peak detector signal, the indicator 67 being operated if the peak signal does not exceed this limit.

The operation of the apparatus of FIG. 2 is as follows. The passage of a pulse of welding current through the electrodes 41 and 43 and the layers 45 and 47 will produce a heating in welding zone 53 which passes rapidly through a peak temperature. This peak temperature is an effective measure of weld quality, the weld being satisfactory if the peak temperature lies within determinable upper and lower limits.

The fluctuating temperatures occurring during the welding operation are sensed by detector 55 as a function of the infrared radiation emitted by the welding zone. The detector signal is thus an analog of welding zone temperature. Accordingly, since the comparator circuits 61 and 63 are operative to provide respective indications if the peak detector signal varies from the preselected limits, it can be seen that the settings of potentiometers R5 and R6 also establish corresponding or similarly analogous limits for the peak temperature occurring in welding zone 53. Thus, the absence of an indication at either of the devices 65 and 67 means that the peak welding zone temperature has fallen within the range preselected as satisfactory and that the weld formed between layers 45 and 47 can be expected to be acceptable. The presence of indications provides information useful in adjusting the power source so that satisfactory welds can be obtained.

Figure 3:
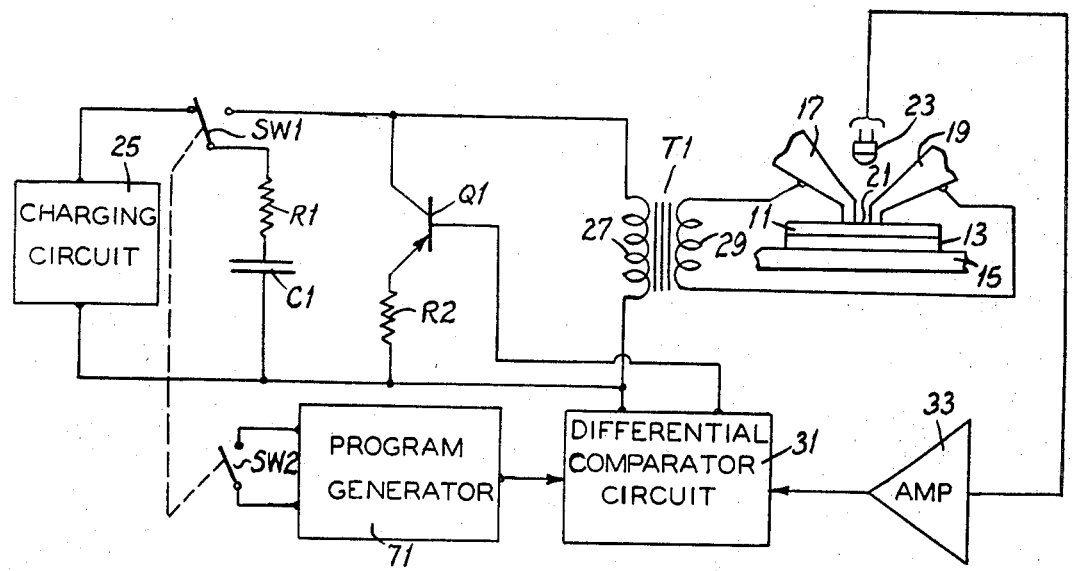
FIG. 3 is a diagrammatic illustration of pulse welding apparatus in which the welding zone temperature is controlled according to a preselected program.

FIG. 3 illustrates a modification of the apparatus of FIG. 1 which controls the temperature in the welding zone according to a preselected program. The program provides a period of preheat and a period of postheat so as to reduce thermal shocks between the metallic layers 11 and 13 being welded and the substrate 15. The welding circuit and the capacitive discharge power source which supplies the welding energy are essentially similar to the arrangements shown in FIG. 1. However, in the apparatus of FIG. 3, circuit 31 compares the detector signal with a reference voltage which varies as a preselected function of time. This time-varying reference voltage is provided by a program generator 71 and is an analog of a preselected program of temperature for the welding zone.

The time-varying reference voltage can be generated by a recording or by internally timed level switching as, for example, by appropriate multivibrator circuits. The generation of a program is initiated by the closing of a switch SW2 which is ganged for operation with the switch SW1 which initiates the discharge of capacitor C1 into the welding circuit. Thus the program will be initiated simultaneously or in response to the initiation of a welding pulse.

The apparatus shown in FIG. 3 constitutes a feedback loop and the differential comparator circuit 31 will thus modulate the welding current in such a fashion that the signal provided by the detector 23 tends to track the time-varying reference voltage provided by program generator 71. The variations in welding current will cause the temperature in the welding zone 21 to vary correspondingly and thus to fluctuate in accordance with the program dictated by generator 71 so long as sufficient energy is available from capacitor C1.

Figure 5:
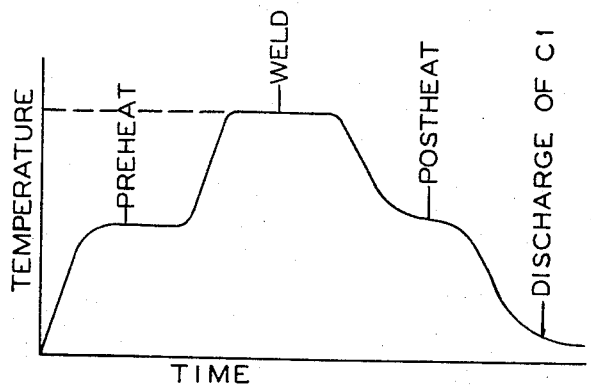
FIG. 5 is a graph illustrating a temperature behavior program which can be obtained with the apparatus of FIG. 3.

FIG. 5 illustrates a highly desirable temperature program for the welding of metallic films supported on insulating substrates. The temperature in the weld zone is first brought to an intermediate temperature for a preselected length of time to pre-heat the area surrounding the welding zone. The temperature is then raised to a controlled level suitable for welding the metallic materials for a period sufficient to permit fusion and is finally dropped again to an intermediate temperature for a short interval to provide a more gradual cooling which will not develop excessive thermal stresses. After the post-heat period the temperature is alowed to drop naturally as the charge is exhausted from capacitor C1.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. Quality verifying welding apparatus for resistance welding connections in miniature electronic networks comprising:
   a welding circuit including at least one pair of electrodes, said electrodes being spaced to provide for a weld zone in work to which the electrodes are applied;
   a power source for selectively applying a pulse of welding current to said welding circuit;
   detector means for sensing infrared radiation emitted from said weld zone and providing an electrical signal which is a function of the intensity of said radiation;
   means for determining the peak value of said electrical signal;
   discriminator means for comparing said peak value with preselected minimum and maximum limits for said value; and
   means, responsive to said discriminator means, for providing an indication if said peak value does not fall between said limits.

2. Quality verifying welding apparatus for resistance welding connections in miniature electronic networks comprising:
   a welding circuit including at least one pair of electrodes, said electrodes being spaced to provide for a weld zone in work to which the electrodes are applied;
   a power source for selectively applying a pulse of welding current to said welding circuit;
   detector means for sensing infrared radiation emitted from said weld zone and providing an electrical signal which is a function of the intensity of said radiation;
   means for determining the peak value of said electrical signal during the application of a pulse of welding current to said welding circuit;
   means for providing a first reference signal which is an analog of a preselected upper limit of temperature for said weld zone;
   a first differential comparator circuit for comparing said peak value with said first reference signal;
   indicator means, responsive to said first comparator circuit, for providing an indication if said peak value exceeds said first reference signal;
   means for providing a second reference signal which is an analog of a preselected lower limit of temperature for said weld zone;
   a second differential comparator circuit for comparing said peak value with said second reference signal; and
   indicator means, responsive to said second comparator circuit, for providing an indication if said peak value falls below said second reference signal whereby an indication will be given if the peak temperature experienced by said weld zone does not fall between said preselected upper and lower limits.

References Cited

UNITED STATES PATENTS

| | | | |
|---|---|---|---|
| 1,168,346 | 1/1916 | Thomson | 219—113 |
| 2,817,747 | 12/1957 | Devonshire | 219—110 |

RICHARD M. WOOD, *Primary Examiner.*

P. W. MAY, *Assistant Examiner.*